F. H. WALKER.
BRICKMAKING MACHINE.
APPLICATION FILED SEPT. 19, 1919.
1,350,628.
Patented Aug. 24, 1920.
3 SHEETS—SHEET 1.
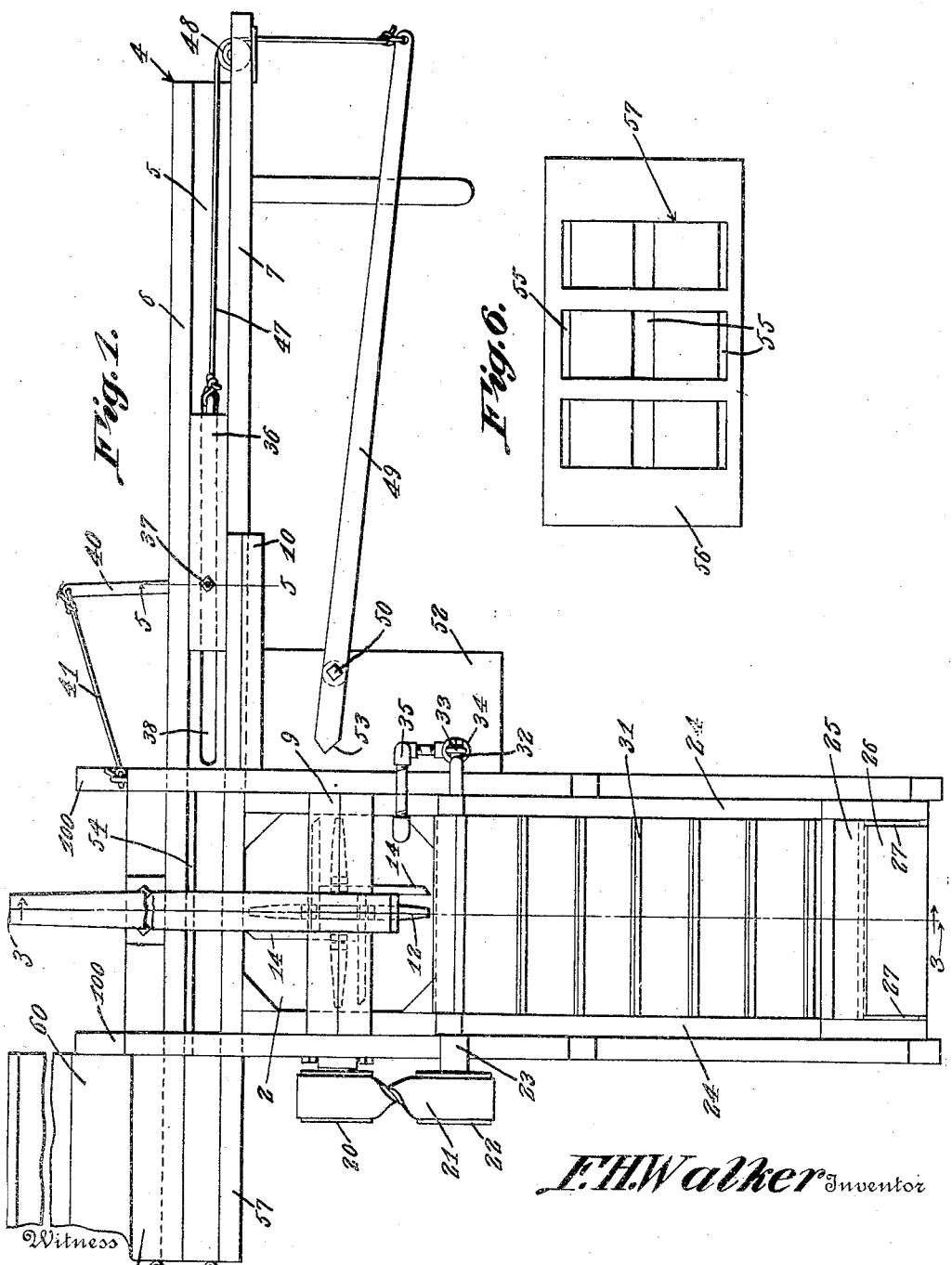

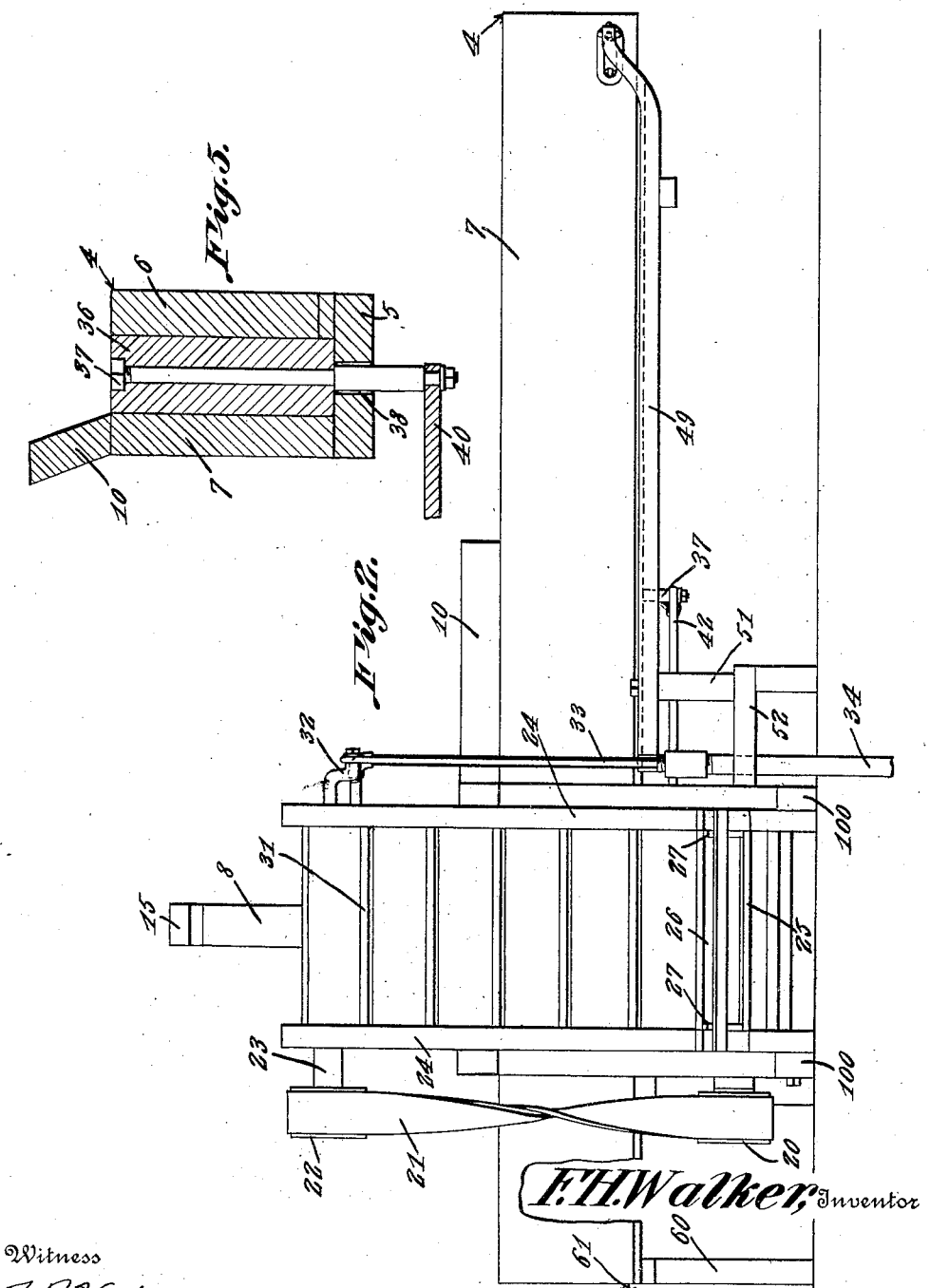

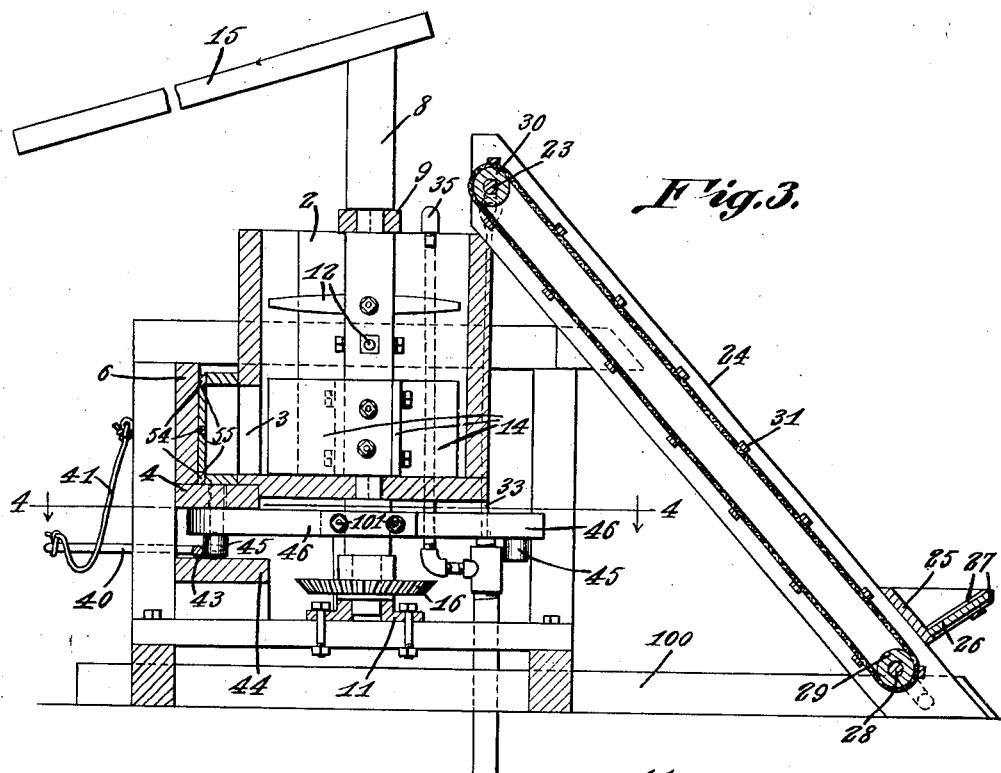
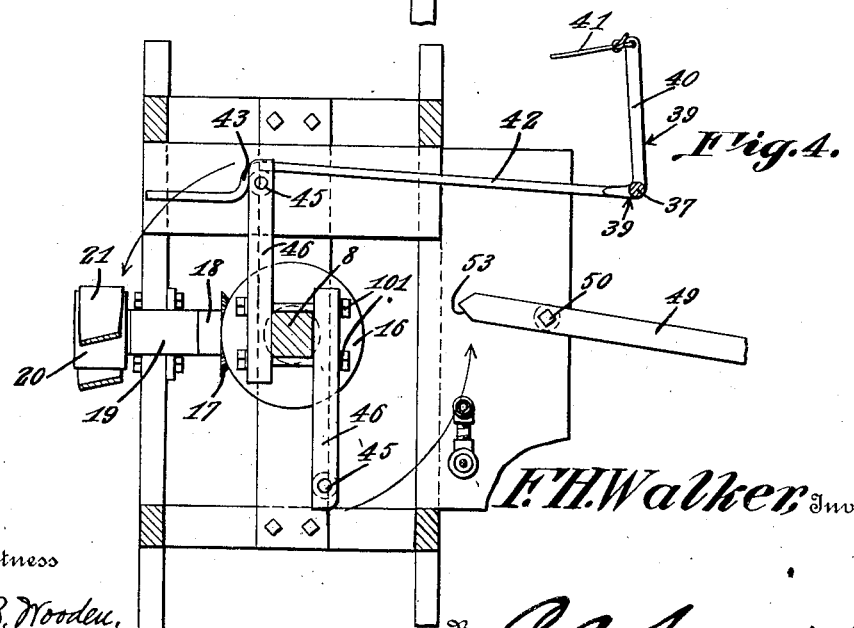

UNITED STATES PATENT OFFICE.

FREMAN HENRY WALKER, OF BOSWELL, OKLAHOMA.

BRICKMAKING-MACHINE.

1,350,628.　　　　　Specification of Letters Patent.　　Patented Aug. 24, 1920.

Application filed September 19, 1919. Serial No. 324,750.

*To all whom it may concern:*

Be it known that I, FREMAN H. WALKER, a citizen of the United States, residing at Boswell, in the county of Choctaw and State of Oklahoma, have invented a new and useful Brickmaking-Machine, of which the following is a specification.

The device forming the subject matter of this application is a brick making machine, and one object of the invention is to provide novel means whereby the plastic material may be forced out of a hopper into molds, as the molds are advanced, one after another, toward the hopper.

Another object of the invention is to provide novel means for operating the follower which advances the molds.

A further object of the invention is to provide novel means for conveying the plastic material to the hopper and for moistening the material in the hopper.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understool that, within the scope of what is claimed, changes in the precise embodiment of the invention shown can be made without departing from the spirit of the invention.

In the accompanying drawings:—

Figure 1 shows in top plan, a device constructed in accordance with the invention; Fig. 2 is an elevation of the complete machine; Fig. 3 is a transverse section taken approximately on the line 3—3 of Fig. 1; Fig. 4 is a section taken approximately on the line 4—4 of Fig. 3; Fig. 5 is a section taken on the line 5—5 of Fig. 1; and Fig. 6 is a plan showing one of the molds.

The machine forming the subject matter of this application includes a main frame 1, which need not be described in detail, since the frame may be constructed variously, without jeopardizing the utility of the invention. Those parts of the frame which have important functions will be alluded to hereinafter. A vertically disposed box-like hopper 2 is mounted on the frame 1 and is provided adjacent its bottom, with an opening 3 located in the rear wall of the hopper. A horizontal chute 4 is supported on the frame 1 and includes a bottom 5, a side 6 and a side 7, the side 7 carrying a guide board 10 located relatively near to the hopper 2. A cross bar 9 is mounted on the upper end of the hopper 2.

A vertical shaft 8 is journaled for rotation in the cross bar 9, in the bottom of the hopper 2 and in a thrust bearing 11 carried by the lower portion of the frame. The shaft 8 may be rotated by any desired means. In the present instance, but not of necessity, rotation is imparted to the shaft 8 by means of a sweep 15. In the hopper 2, the shaft 8 carries agitating arms 12. Below the arms 12, feeding blades 14 are secured to the shaft, these blades operating close to the bottom of the hopper and opposite to the opening 3 in the rear wall of the hopper.

A horizontally disposed gear wheel 16 is secured to the shaft 8 below the bottom of the hopper, the gear wheel meshing into a vertical pinion 17 secured to a shaft 18 mounted to rotate on a horizontal axis in a bearing 19 secured to the lower portion of the main frame 1. On the outer end of the shaft 18 there is a pulley 20 engaged with a belt 21, the belt coöperating with a pulley 22 on one end of a shaft 23 journaled in the upper end of an inclined conveyer frame 24, the conveyer frame being supported on one edge of the hopper 2 and on an outwardly projecting portion 100 of the main frame 1. A receiving trough 25 is mounted on the lower end of the conveyer frame 24 and has a removable side 26, slidable in guides 27 mounted on the ends of the trough, the side being removable to permit the trough to be cleaned out if desired. The lower shaft 28 is journaled for rotation in the conveyer frame 24, near to the lower end thereof, the lower shaft carrying an idle roller 29. A roller 30 is mounted on the upper shaft 23 and about the rollers 29 and 30 is passed a belt conveyer 31 operated within the conveyer frame 24. That end of the shaft 23 which is remote from the pulley 20 is provided with a crank 32 operatively connected with the plunger 33 of a pump 34 having an outlet 35 discharging into the hopper 2.

A follower 36 is mounted for reciprocation in the chute 4, the follower carrying, as shown in Fig. 5, a rod 37, operating in a slot 38 formed in the bottom 5 of the chute 4. On the rod 37, below the bottom 5 of the chute 4, a bell crank lever 39 is mounted to swing horizontally. The bell crank lever 39 includes a laterally extending arm 40 connected by a flexible element 41 within any accessible portion of the main frame 1. The bell crank lever 39 includes, further, an arm 42, which extends in the general direction of the chute, the arm having, as shown in Fig. 4, an offset arm 42. The end of the arm 42 which carries the shoulder 43 is mounted to slide on a platform 44 constituting a part of the frame 1. Arms 46 are secured as shown at 101 to the shaft 8 and are located between the bottom of the hopper 2 and the gear wheel 16. Rollers 45 are journaled on the arms 46, the axes of the rollers being vertical, and the rollers being adapted to coact, one at a time, with the shoulder 43 in the arm 42 of the bell crank lever 39.

One end of a flexible element 47 is attached to the rear end of the follower 36, the flexible element being trained around a sheave 48 carried by the outer end of the side 7 of the chute 4. From the sheave 48, the flexible element extends transversely of the machine and is secured to one end of a lever 49, fulcrumed as shown at 50, relatively near to its other end on a post 51 upstanding from its projecting portion 52 of the main frame 1. That end of the lever 49 which is adjacent to the fulcrum 50 of the lever is beveled as shown at 53, to coöperate with the ends of the arms 46 on the shaft 8, in a way which will be set forth hereinafter.

The wall 6 of the chute 4 is provided, opposite to the opening 3 in the rear wall of the hopper 2, with horizontal guides 54, adapted to be received in grooves 55 formed in a mold 56 having compartments 57 corresponding in size to the bricks which are to be turned out.

As shown at 57 in Fig. 1, the wall 7 of the chute 4 extends beyond the hopper 2, the opposite portion of the wall 6 being cut away to accommodate a pallet 59 mounted on a table 60 secured removably to the bottom portion 5 of the chute 4, by a hook, or otherwise, as indicated at 61.

In practical operation, a mold 56 is slid downwardly along the guide board 10 into the chute 4 in front of the follower 36. The follower 36 advances the mold until the grooves 55 in the mold coöperate with the guides 54 on the wall 6 of the chute. At this time, the mold is opposite to the opening 3 in the rear wall of the hopper 2, as shown in Fig. 3, and is adapted to receive the material from the hopper 2. When the shaft 8 is rotated by means of the sweep 15 or otherwise, the blades 14 on the shaft advance the plastic material in the hopper 2 through the opening 3 and into the compartments 57 of the mold 56. The mold, subsequently, is pushed along by an action of another mold, inserted between the filled mold and the follower 36. As the filled mold is moved to the left (Fig. 1), the material in the compartments 57 of the mold 56 is stricken off and moves down by the rear wall of the hopper 2 as the filled mold moves to the left. The filled mold moves to the left in contact with the part 57 of the wall 7 of the chute 4 and the mold may be inverted to deposit the molded bricks on the pallet 59. The pallet 59 may be removed from the table 60, the bricks being carried to the place of lying or burning.

When the shaft 8 is rotated, the gear wheel 16, coöperating with the pinion 17, drives the shaft 18, the pulley 20 operating the belt 21, and the belt 21 rotating the shaft 23 through the instrumentality of the pulley 22. The shaft 23 drives the conveyer 31 by way of the roller 30. The material in the trough 25 may be placed on the conveyer 31, the conveyer elevating the material and discharging it into the hopper 2. When the shaft 23 is rotated, the crank 32 on the shaft actuates the pump 34 and, by way of the outlet pipe 35, water is discharged from the pump into the hopper 2. When the shaft 8 is rotated, the blades 14 agitate the material and the water in the hopper 2 to form a plastic mass discharged by the blades 14 through the opening 3 into the molds 56 as hereinbefore described.

The operation of the mechanism for advancing and retracting the follower 36 will now be taken up.

When the shaft 8 rotates, the roller 45 on one arm 46 engages the shoulder 43 of the arm 42 of the bell crank lever 39. Since the bell crank lever 39 is pivoted at its angle to the follower 36 by means of the element 37, the follower will be advanced, and the molds in front of the follower will be advanced to the opening 3 of the hopper 2. Assuming that the arm 46 and its roller 45 have advanced the follower 36, the roller 45 ultimately rides off the shoulder 43 in the arm 42, the arm 42 swinging in a clockwise direction, in Fig. 4. The end of the other arm 46 on the shaft 8 engages the beveled end 53 of the lever 49 and tilts the lever 49 on its fulcrum 50. The flexible element 47, being actuated by the lever 49, draws the follower 36 rearwardly. When the follower 36 arrives at the end of its travel to the right (Fig. 1), the flexible element 41 tightened up and, since the bell crank lever 39 is carried rearwardly, bodily, by the follower 36, the arm 42 of the bell crank lever is swung in a counter clockwise direction (Fig. 4) this counter clockwise swinging movement of the arm 42 of the bell crank lever so positions the shoulder 42 that the same will coöperate with the roller 45 as the roller moves in an orbit, indicated by the arrows, into the position shown in Fig. 4.

Having thus described the invention, what is claimed is:—

1. In a device of the class described, a hopper; a mold chute coöperating with the hopper; a follower mounted to reciprocate in the chute; a rotary feeder including a part operating in the hopper; means operated by the feeder for advancing the follower; and means operated by the feeder for retracting the follower.

2. In a device of the class described, a hopper; a mold chute coöperating with the hopper; a follower mounted to reciprocate in the chute; a rotary feeder having an arm and including a part operating in the hopper; a swinging member pivoted to the follower; means for swinging said member into the path of the arm when the follower is retracted, whereby the arm may advance the follower; and means operated by the arm for retracting the follower.

3. In a device of the class described, a hopper; a mold chute coöperating with the hopper; a follower mounted to reciprocate in the chute; a rotary feeder having an arm and including a part operating in the hopper; a bell crank pivoted to the follower and including a lateral arm and a second arm; a yieldable element having a fixed length, one end of said element being anchored, and the other end thereof being connected to the lateral arm of the bell crank thereby to swing the second arm of the bell crank into the path of the arm of the feeder when the follower is retracted, whereby the arm of the feeder will advance the follower; and means operated by the arm for retracting the follower.

4. In a device of the class described, a hopper; a mold chute coöperating with the hopper; a follower mounted to reciprocate in the chute; a rotary feeder having an arm and including a part operating in the hopper; a swinging member pivoted to the follower; means for swinging said member into the path of the arm when the follower is retracted, whereby the arm may advance the follower; a lever fulcrumed intermediate its ends, one end of the lever lying in the path of the arm; and means for connecting the other end of the lever with the follower to retract the follower.

5. In a device of the class described, a hopper; a mold chute coöperating with the hopper; a follower mounted to reciprocate in the chute; a rotary feeder having an arm and including a part operating in the hopper; a bell crank pivoted to the follower and including a lateral arm and a second arm; a yieldable element having a fixed length, one end of said element being anchored, the other end thereof being connected to the lateral arm of the bell crank, thereby to swing the second arm of the bell crank into the path of the arm of the feeder when the follower is retracted, whereby the arm of the feeder may advance the follower; a lever pivotally supported intermediate its ends, one end of the lever lying in the path of the arm of the feeder; and means for connecting the other end of the lever with the follower to retract the follower.

In testimony that I claim the foregoing as my own, I have hereto affixed my signature in the presence of two witnesess.

FREMAN HENRY WALKER.

Witnesses:
R. L. LOWDERMILK,
O. B. BUSAFURD.